(12) United States Patent
Flachs et al.

(10) Patent No.: US 8,595,467 B2
(45) Date of Patent: Nov. 26, 2013

(54) FLOATING POINT COLLECT AND OPERATE

(75) Inventors: Brian K. Flachs, Georgetown, TX (US); Seiji Maeda, Tokyo (JP); Steven Osman, Foster City, CA (US)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 12/648,527

(22) Filed: Dec. 29, 2009

(65) Prior Publication Data

US 2011/0161624 A1 Jun. 30, 2011

(51) Int. Cl.
*G06F 9/00* (2006.01)
(52) U.S. Cl.
USPC .......................................................... 712/22
(58) Field of Classification Search
USPC .......................................................... 712/22
See application file for complete search history.

(56) References Cited

U.S. PATENT DOCUMENTS

| | | | |
|---|---|---|---|
| 6,714,197 B1 | 3/2004 | Thekkath et al. | |
| 7,099,910 B2 | 8/2006 | Brooks et al. | |
| 7,242,414 B1 | 7/2007 | Thekkath et al. | |
| 7,284,117 B1 | 10/2007 | Radhakrishnana et al. | |
| 7,366,873 B1* | 4/2008 | Kohn | 712/4 |
| 2006/0020770 A1* | 1/2006 | Ebisuzaki et al. | 712/22 |
| 2009/0077345 A1* | 3/2009 | Moyer | 712/4 |

OTHER PUBLICATIONS

Hillis, W. Daniel. Steele, Guy. "Data Parallel Algorithms". Communications of the ACM, vol. 29, No. 12, Dec. 1986. pp. 1170-1183.*
Mayer-Lindenberg, Fritz et al., "An FPGA-based floating-point processor array supporting a high-precision dot product", IEEE, INSPEC Database, Conference Paper, 2006, 4 pages.

* cited by examiner

*Primary Examiner* — Robert Fennema
(74) *Attorney, Agent, or Firm* — Stephen R. Tkacs; Stephen J. Walder, Jr.; Matthew B. Talpis

(57) ABSTRACT

Mechanisms are provided for performing a floating point collect and operate for a summation across a vector for a dot product operation. A routing network placed before the single instruction multiple data (SIMD) unit allows the SIMD unit to perform a summation across a vector with a singe stage of adders. The routing network routes the vector elements to the adders in a first cycle. The SIMD unit stores the results of the adders into a results vector register. The routing network routes the summation results from the results vector register to the adders in a second cycle. The SIMD unit then stores the results from the second cycle in the results vector register.

12 Claims, 3 Drawing Sheets

FLOATING POINT COLLECT AND OPERATE

BACKGROUND

The present application relates generally to an improved data processing apparatus and method and more specifically to mechanisms for performing a floating point collect and operate for a summation across a vector for a dot product operation.

The dot product, also known as the scalar product, is an operation that takes two vectors over the real numbers R and returns a real-valued scalar quantity. The dot product is the standard inner product of the orthonormal Euclidean space. It contrasts with the cross product which produces a vector result. The dot product of vectors a=[$a_1$, $a_2$, ..., $a_n$] and b=[$b_1$, $b_2$, ..., $b_n$] is defined as follows:

$$a \cdot b = \sum_{i=1}^{n} a_i b_i = a_1 b_1 + a_2 b_2 + \ldots + a_n b_n$$

where Σ denotes summation and n is the dimension of the vectors. Thus, the dot product represents a mathematical operation that requires computing a summation across a vector.

Multimedia extensions (MMEs) have become one of the most popular additions to general-purpose microprocessors. Existing multimedia extensions can be characterized as single instruction multiple data (SIMD) path units that support packed fixed-length vectors. When an operation requiring a summation across a vector takes advantage of a SIMD instruction set, the operation must operate across the SIMD elements. Some operations, such as floating point addition, are very expensive, particularly in terms of latency.

An addition of four floating point values from a SIMD operand requires two adders in a first stage and a single adder in the second stage. Thus, the pipeline required to execute the floating point summation of a SIMD operand is twice as long as required to perform an addition of two SIMD words. Furthermore, the average result throughput is one result per cycle in comparison to the SIMD operation that could produce four results per cycle.

SUMMARY

In one illustrative embodiment, a method, in a data processing system, is provided for performing a floating point collect and operate for a summation across a vector. The method may comprise routing, by a routing network in a first cycle, a first vector element and a second vector element from an input vector register to a single instruction multiple data (SIMD) unit, performing, by the SIMD unit in the first cycle, a first addition operation and a second addition operation such that the first addition operation adds the first vector element and the second vector element to form a first result and the second addition operation adds a third vector element and a fourth vector element from the input vector register to form a second result, and storing, by the SIMD unit in a first cycle, the first result into a first element of a result vector register and the second result into a second element of the result vector register. The method may further comprise routing, by the routing network in a second cycle, the first element and the second element of the result vector register to the SIMD unit, performing, by the SIMD unit in the second cycle, a third addition operation such that the third addition operation adds the first result and the second result to form a summation across the input vector register, and storing, by the SIMD unit in the second cycle, the summation across the input vector register into an element of the result vector register.

In another illustrative embodiment, an apparatus for performing a floating point collect and operate for a summation across a vector may comprise a routing network and a single instruction multiple data (SIMD) unit. The routing network may be configured to route, in a first cycle, a first vector element and a second vector element from an input vector register to the SIMD unit. The SIMD unit may be configured to perform, in the first cycle, a first addition operation and a second addition operation such that the first addition operation adds the first vector element and the second vector element to form a first result and the second addition operation adds a third vector element and a fourth vector element from the input vector register to form a second result. The SIMD unit may be configured to store, in the first cycle, the first result into a first element of a result vector register and the second result into a second element of the result vector register. The routing network may be configured to route, in a second cycle, the first element and the second element of the result vector register to the SIMD unit. The SIMD unit may be configured to perform, in the second cycle, a third addition operation such that the third addition operation adds the first result and the second result to form a summation across the input vector register. The SIMD unit may be configured to store, in the second cycle, the summation across the input vector register into an element of the result vector register.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for performing a floating point collect and operate for a summation across a vector for a dot product operation. A routing network placed before the single instruction multiple data (SIMD) unit allows the SIMD unit to perform a summation across a vector with a single stage of adders. The routing network routes the vector elements to the adders in a first cycle. The SIMD unit stores the results of the adders into a results array. The routing network routes the summation results from the results array to the adders in a second cycle. The SIMD unit then stores the results from the second cycle in the results array.

This operation results in a two-to-one compression such that performing the operation again on the first result finishes the compression to one result. This operation effectively breaks the original addition across the vector into two operations of shorter latency. For the cost of the routing network, the design reduces the number of adders and may reduce the pipeline depth of the design.

As such, the illustrative embodiments may be implemented in any data processing system using a SIMD engine and SIMD vector registers. One such data processing system is the Cell Broadband Engine™ (Cell/B.E.™) data processing system available from International Business Machines, Inc. or Armonk, N.Y. The Cell/B.E.™ architecture will be used as a basis for the description of the illustrative embodiments. However, it should be appreciated that the Cell/B.E.™ architecture is only illustrative and is not intended to state or imply any limitation with regard to the types of data processing systems or architectures in which the illustrative embodiments may be implemented.

Figure 1:
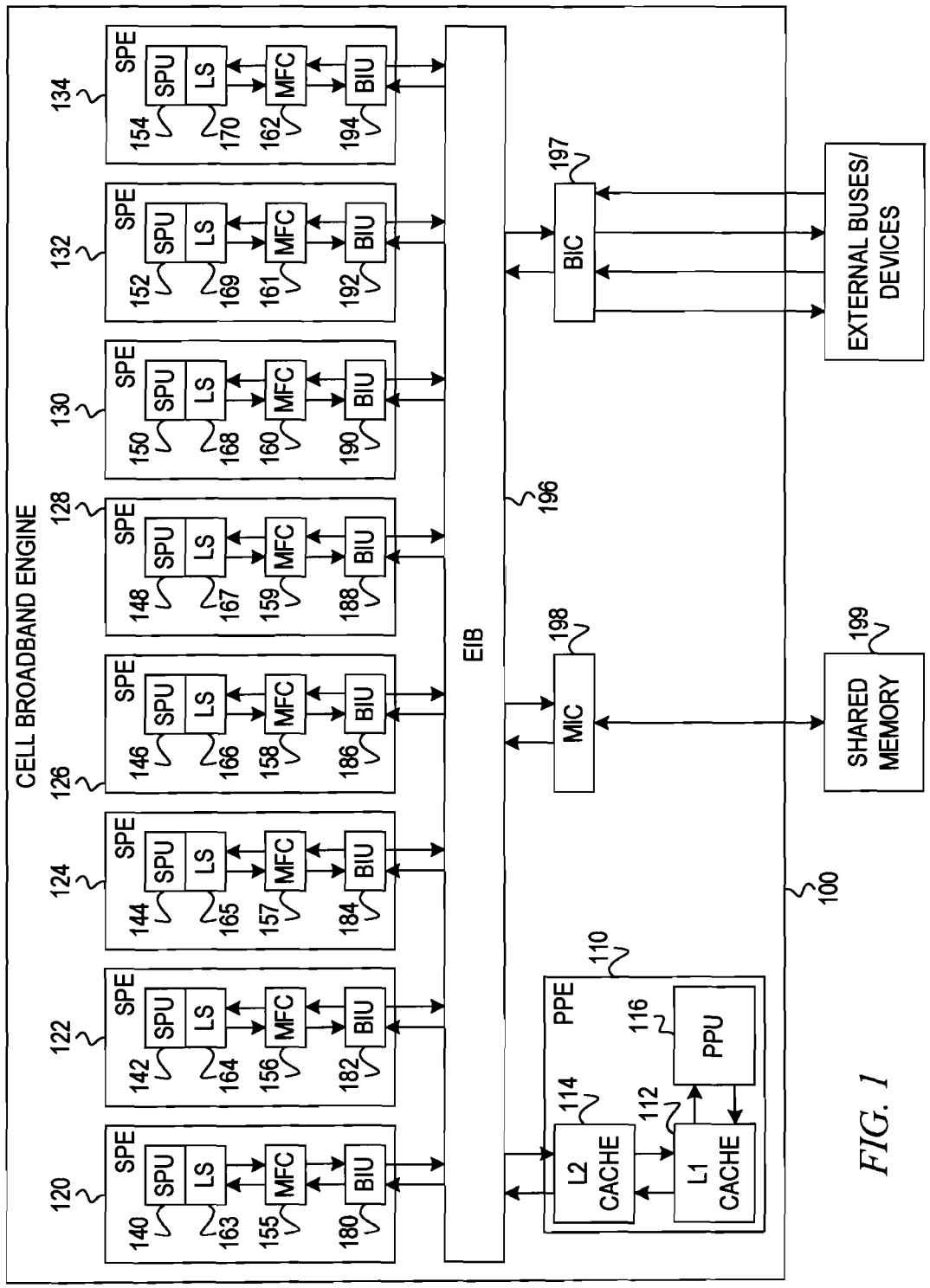
FIG. 1 is an exemplary block diagram of a data processing system in which aspects of the present invention may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIG. 1 is provided hereafter as an example environment in which aspects of the illustrative embodiments may be implemented. While the description following FIG. 1 will focus primarily on a single data processing device implementation, this is only an example and is not intended to state or imply any limitation with regard to the features of the present invention. To the contrary, the illustrative embodiments are intended to include distributed data processing environments and embodiments in which a summation across a vector is performed using a SIMD processor.

FIG. 1 is an exemplary block diagram of a data processing system in which aspects of the present invention may be implemented. The exemplary data processing system shown in FIG. 1 is an example of the Cell Broadband Engine™ (Cell/B.E.™) data processing system. While the Cell/B.E.™ processor will be used in the description of the preferred embodiments of the present invention, the present invention is not limited to such, as will be readily apparent to those of ordinary skill in the art upon reading the following description.

The Cell Broadband Engine™ architecture combines a general-purpose Power Architecture® core of modest performance with streamlined co-processing elements that greatly accelerate multimedia and vector processing applications, as well as many other forms of dedicated computation. The co-processing elements, referred to as synergistic processing elements (SPEs) greatly accelerate multimedia and vector processing applications, as well as many other forms of dedicated computation. The Cell Broadband Engine™ (Cell/B.E.™) processor is a single chip multi-core architecture that provides low cost and high performance a wide range of applications from computer games to many compute-intensive applications in various application domains, such as seismic data processing, bioinformatics, graph processing, etc. CELL BROADBAND ENGINE and CELL/B.E. are trademarks of Sony Computer Entertainment, Inc., in the United States, other countries, or both. POWER ARCHITECTURE is a registered trademark of IBM Corporation in the United States, other countries, or both.

As shown in FIG. 1, the Cell/B.E.™ processor 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The Cell/B.E.™ processor 100 may be a system-on-a-chip such that each of the elements depicted in FIG. 1 may be provided on a single microprocessor chip. Moreover, the Cell/B.E.™ processor 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions using a single instruction multiple data (SIMD) execution unit.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the Cell/B.E.™ processor 100 and other external buses and devices.

The PPE 110 is a dual threaded PPE 110. The combination of this dual threaded PPE 110 and the eight SPEs 120-134 makes the Cell/B.E.™ 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFlops of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

In accordance with the illustrative embodiments, the SPEs 120-134 may implement SIMD engines having SIMD vector registers. The illustrative embodiments provide a compiler for optimizing executable code for execution on such SIMD engines in SPEs 120-134. In particular, the illustrative embodiments perform a floating point collect and operate for a summation across a vector for a dot product operation.

Figure 2:
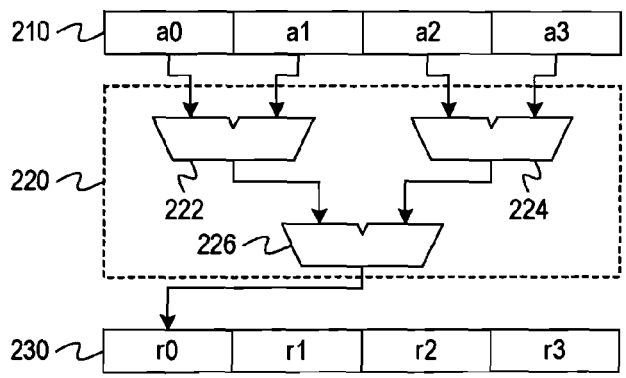
FIG. 2 depicts a single instruction multiple data (SIMD) unit for performing a floating point summation across a vector using a complex adder in accordance with an illustrative embodiment.

FIG. 2 depicts a single instruction multiple data (SIMD) unit for performing a floating point summation across a vector using a complex adder in accordance with an illustrative embodiment. SIMD unit 220 receives SIMD elements from vector register 210, performs a collect and add operation, and stores the result in result register 230. This operation may be part of a dot product operation, also referred to as an inner product operation. For example, in the example shown in FIG. 2, the dot product of vectors a=[$a_1$, $a_2$, $a_3$, $a_4$] and b=[$b_1$, $b_2$, $b_3$, $b_4$] is defined as follows:

$$a \cdot b = a_1 b_1 + a_2 b_2 + a_3 b_3 + a_4 b_4$$

where $a_i$ is an element of the vector a and $b_i$ is an element of the vector b. The results of the multiplication, $a_i b_i$, are stored in vector register 210 such that $a_1 b_1$ is stored in a0, $a_2 b_2$ is stored in a1, $a_3 b_3$ is stored in a2, and $a_4 b_4$ is stored in a3 of vector register 210. The elements of vector register 210 are then summed together to result in the dot product of a and b. Thus, the SIMD unit 220 in FIG. 2 performs this summation.

SIMD unit 220 comprises a complex adder comprising adders 222, 224, and 226. Adder 222 receives as inputs SIMD elements a0 and a1. Adder 224 receives as inputs SIMD elements a2 and a3. It follows that adder 226 receives as inputs [a0+a1] and [a2+a3] and stores the output, [a0+a1+a2+a3], in element r0 of result register 230.

Thus, in this example, an addition of four floating point values from a SIMD operand requires two adders in a first stage and a single adder in the second stage. The pipeline required to execute the floating point summation of a SIMD operand is twice as long as required to perform an addition of two SIMD words. Furthermore, the average result throughput is one result per cycle in comparison to the SIMD operation that could produce four results per cycle.

Figure 3:
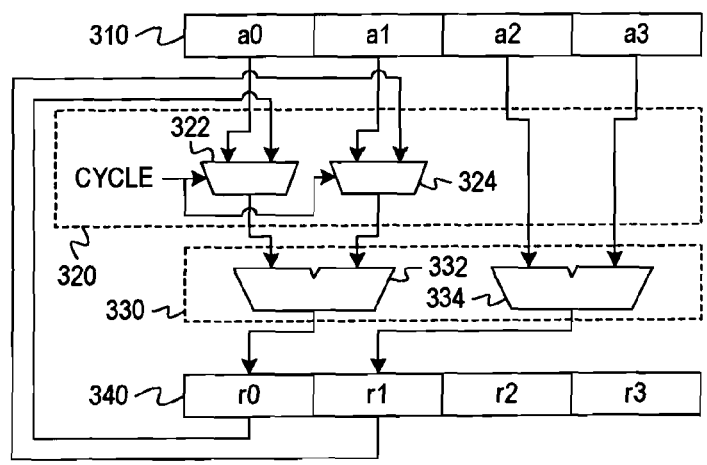
FIG. 3 depicts a single instruction multiple data (SIMD) unit for performing a floating point summation across a vector using a routing network in accordance with an illustrative embodiment.

FIG. 3 depicts a single instruction multiple data (SIMD) unit for performing a floating point summation across a vector using a routing network in accordance with an illustrative embodiment. SIMD unit 330 receives inputs from routing network 320. In a first cycle, CYCLE=0, SIMD unit 330 receives inputs from vector register 310, performs an addition operation, and stores the results in result register 340. In a second cycle, CYCLE=1, SIMD unit 330 receives inputs from result register 340, performs an addition operation, and stores the results in result register 340.

This operation may be part of a dot product operation, also referred to as an inner product operation. For example, in the example shown in FIG. 3, the dot product of vectors a=[$a_1$, $a_2$, $a_3$, $a_4$] and b=[$b_1$, $b_2$, $b_3$, $b_4$] is defined as follows:

$$a \cdot b = a_1 b_1 + a_2 b_2 + a_3 b_3 + a_4 b_4$$

where $a_i$ is an element of the vector a and $b_i$ is an element of the vector b. The results of the multiplication, $a_i b_i$, are stored in vector register 310 such that $a_1 b_1$ is stored in a0, $a_2 b_2$ is stored in a1, $a_3 b_3$ is stored in a2, and $a_4 b_4$ is stored in a3 of vector register 310. The elements of vector register 310 are then summed together to result in the dot product of a and b. Thus, the SIMD unit 330, with routing network 320, performs this summation.

Routing network 320 comprises multiplexers 322 and 324, which provide inputs to adder 332 based on selection signal, CYCLE. Thus, in the first cycle, CYCLE=0, multiplexer 322 routes a0 to the first input of adder 332, and multiplexer 324 routes a1 to the second input of adder 332. During the second cycle, CYCLE=1, multiplexer 322 routes r0 to the first input of adder 332, and multiplexer 324 routes r1 to the second input of adder 332.

SIMD unit 330 comprises adders 332 and 334. As described above, in the first cycle, adder 332 receives as inputs SIMD elements a0 and a1, and adder 334 receives as inputs SIMD elements a2 and a3. Adder 332 stores its result, [a0+a1], in r0 of result register 340; and adder 334 stores its result, [a2+a3], in r1 of result register 340. In the second cycle, adder 332 receives as inputs r0, [a0+a1], and r1, [a2+a3], and stores the output, [a0+a1+a2+a3], in element r0 of result register 340.

This operation performs a two-to-one compression such that performing the operation again on the first result finishes the compression to one result. This operation effectively breaks the original addition across the vector into two operations of shorter total latency. This reduces the number of floating point adders in the design and may reduce the pipeline depth of the design due to the reduced latency. However, from a throughput point of view, there is now one result every other cycle. For a synergistic processing element (SPE) design with four SIMD adders, only two adders are used for the first operation, while only one is used for the second operation.

Figure 4:
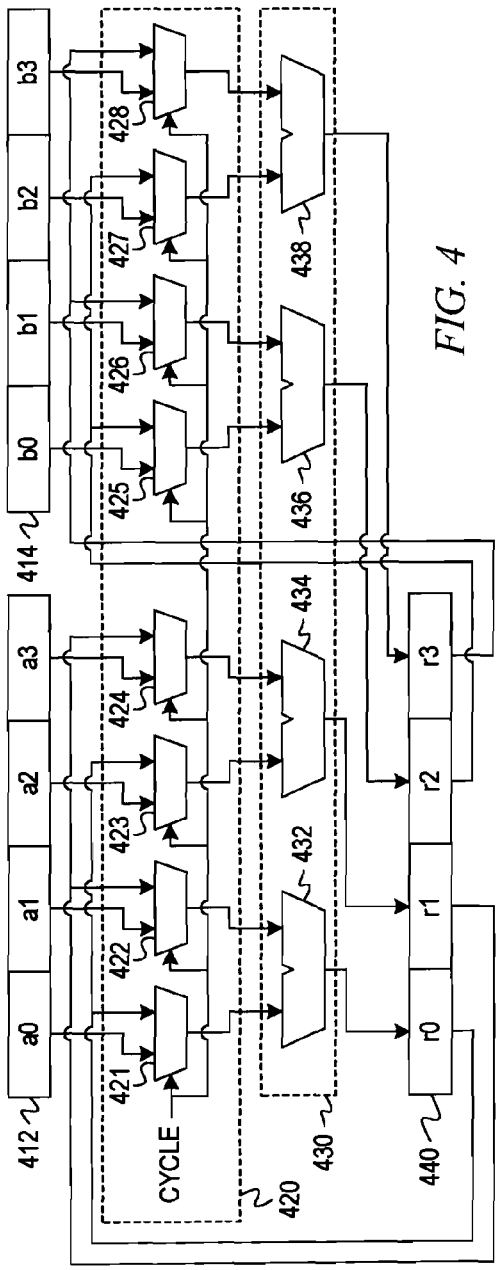
FIG. 4 depicts a single instruction multiple data (SIMD) unit for performing a floating point summation across two vectors using a routing network and four floating point adders in accordance with an illustrative embodiment.

FIG. 4 depicts a single instruction multiple data (SIMD) unit for performing a floating point summation across two vectors using a routing network and four floating point adders in accordance with an illustrative embodiment. SIMD unit 430 receives inputs from routing network 420. In a first cycle, CYCLE=0, SIMD unit 430 receives inputs from vector registers 412 and 414, performs an addition operation, and stores the results in result register 440. In a second cycle, CYCLE=1, SIMD unit 430 receives inputs from result register 440, performs an addition operation, and stores the results in result register 440.

Routing network 420 comprises multiplexers 421-428, which provide inputs to adders 432, 434, 436, and 438 based on selection signal, CYCLE. Thus, in the first cycle, CYCLE=0, multiplexer 421 routes a0 to the first input of adder 432, multiplexer 422 routes a1 to the second input of adder 432, multiplexer 423 routes a2 to the first input of adder 434, multiplexer 424 routes a3 to the second input of adder 434, multiplexer 425 routes b0 to the first input of adder 436, multiplexer 426 routes b1 to the second input of adder 436, multiplexer 427 routes b2 to the first input of adder 438, and multiplexer 428 routes b3 to the second input of adder 438. During the second cycle, CYCLE=1, multiplexer 421 routes r0 to the first input of adder 432, multiplexer 422 routes r1 to the second input of adder 432, multiplexer 423 routes r0 to the first input of adder 434, multiplexer 424 routes r1 to the second input of adder 434, multiplexer 425 routes r2 to the first input of adder 436, multiplexer 426 routes r3 to the second input of adder 436, multiplexer 427 routes r2 to the first input of adder 438, and multiplexer 428 routes r3 to the second input of adder 438.

SIMD unit 430 comprises adders 432, 434, 436, and 438. As described above, in the first cycle, adder 432 receives as inputs SIMD elements a0 and a1, adder 434 receives as inputs SIMD elements a2 and a3, adder 436 receives as inputs SIMD elements b0 and b1, and adder 438 receives as inputs SIMD elements b2 and b3. Adder 432 stores its result, [a0+a1], in r0 of result register 440; adder 434 stores its result, [a2+a3], in r1 of result register 440; adder 436 stores its result, [b0+b1], in r2 of result register 440; and adder 438 stores its result, [b2+b3], in r3 of result register 440. In the second cycle, adder 432 receives as inputs r0, [a0+a1], and r1, [a2+a3], and stores the output, [a0+a1+a2+a3], in element r0 of result register 440; adder 434 receives as inputs r0, [a0+a1], and r1, [a2+a3], and stores the output, [a0+a1+a2+a3], in element r1 of result register 440; adder 436 receives as inputs r2, [b0+b1], and r3, [b2+b3], and stores the output, [b0+b1+b2+b3], in element r2 of result register 440; and, adder 438 receives as inputs r2, [b0+b1], and r3, [b2+b3], and stores the output, [b0+b1+b2+b3], in element r3 of result register 440.

This operation provides two reductions at the same time, doubling the throughput while still using only adders in the original SIMD unit. That is, for a synergistic processing element (SPE) design with four SIMD adders, all four adders are used for the first operation, and the same four adders are used for the second operation. In two operations, r0 and r1 are equal to the sum of vector register 412, and r2 and r3 are equal to the sum of vector register 414. This design provides two results in two cycles, which is the same bandwidth as the complex adder shown in FIG. 2, but features fewer floating point adders and a shallower pipeline.

Figure 5:
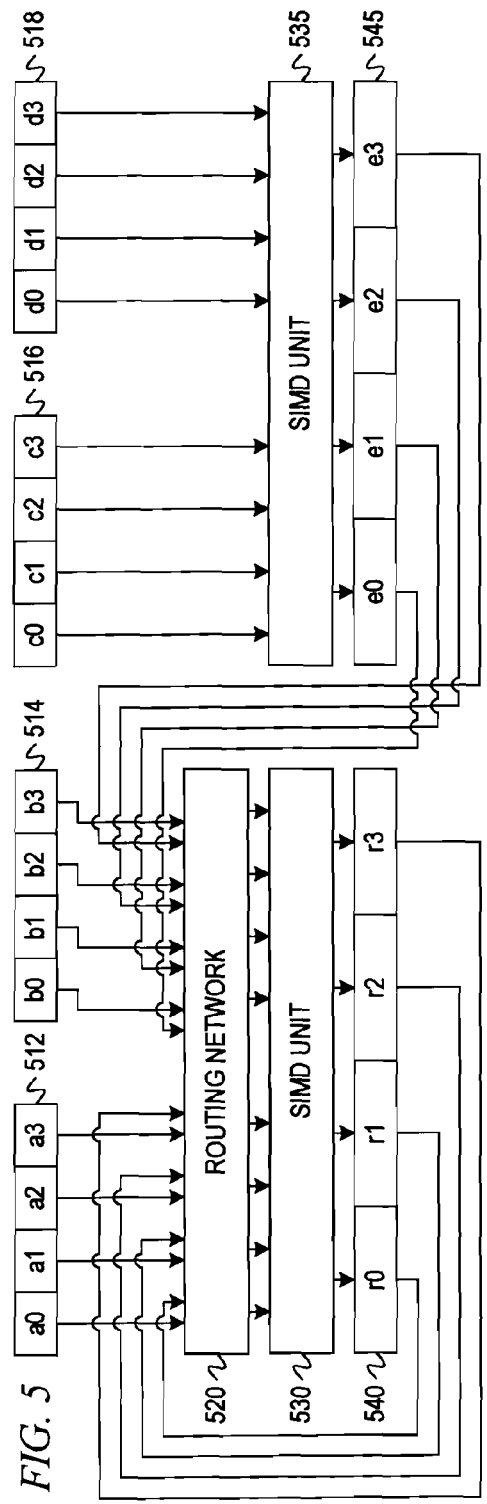
FIG. 5 depicts a single instruction multiple data (SIMD) unit for performing a floating point summation across four vectors using a routing network and two SIMD units in accordance with an illustrative embodiment.

FIG. 5 depicts a single instruction multiple data (SIMD) unit for performing a floating point summation across four vector using a routing network and two SIMD units in accordance with an illustrative embodiment. SIMD unit 530 receives inputs from routing network 520. In a first cycle, CYCLE=0, SIMD unit 530 receives inputs from vector registers 512 and 514, performs an addition operation, and stores the results in result register 540. Also, in the first cycle, SIMD unit 535 receives inputs from vector registers 516 and 518, performs an addition operation, and stores the results in result register 545. In a second cycle, CYCLE=1, SIMD unit 530 receives inputs from result registers 540 and 545, performs an addition operation, and stores the results in result register 540.

Routing network 520 may comprise multiplexers, which provide inputs to floating point adders based on selection signal. Routing network 520 may be similar to the routing network 420 shown in FIG. 4 where the routing includes summation across four vectors rather than two. Thus, in the first cycle, routing network 520 routes elements of vectors 512 and 514 to the adders in SIMD unit 530. During the second cycle, routing network 520 routes elements of result vectors 540 and 545 to the adders in SIMD unit 530.

SIMD units 530, 535 may comprise floating point adders. SIMD units 530, 535 may be similar to the SIMD unit 430 shown in FIG. 4. As described above, in the first cycle, SIMD unit 530 receives as inputs SIMD elements a0, a1, a2, a3, b0, b1, b2, and b3. SIMD unit 530 stores its results in result register 540. More specifically, in the first cycle, SIMD unit 530 stores [a0+a1] in r0 of result register 540, stores [a2+a3] in r1 of result register 540, stores [b0+b1] in r2 of result register 540, and stores [b2+b3] in r3 of result register 540. Similarly, in the first cycle, SIMD unit 535 stores [c0+c1] in e0 of result register 545, stores [c2+c3] in e1 of result register 545, stores [d0+d1] in e2 of result register 545, and stores [d2+d3] in e3 of result register 545. In the second cycle, SIMD unit 530 receives as inputs r0, r1, r2, r3, e0, e1, e2, and e3. SIMD unit 530 stores its results in result register 540. More specifically, in the second cycle, SIMD unit 530 stores [a0+a1+a2+a3] in r0 of result register 540, stores [b0+b1+b2+b3] in r1 of result register 540, stores [c0+c1+c2+c3] in r2 of result register 540, and stores [d0+d1+d2+d3] in r3 of result register 540.

This operation provides three reductions at the same time, doubling the throughput while still using only adders in the original SIMD units. That is, for a synergistic processing element (SPE) design with four floating point adders in each SIMD unit, all four adders are used for the first operation, and the same four adders are used for the second operation. In two operations, r0 is equal to the sum of vector register 512, r1 is equal to the sum of vector register 514, r2 is equal to the sum of vector register 516, and r3 is equal to the sum of vector register 518. This design provides four results in two cycles using two SIMD units.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
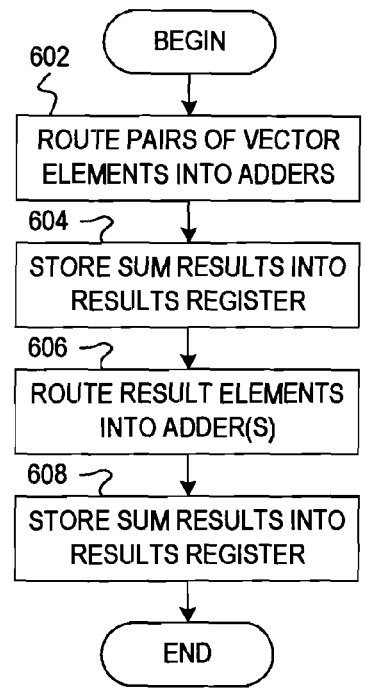
FIG. 6 is a flowchart illustrating operation of a single instruction multiple data (SIMD) unit performing a floating point summation across a vector using a routing network in accordance with an illustrative embodiment.

FIG. 6 is a flowchart illustrating operation of a single instruction multiple data (SIMD) unit performing a floating point summation across a vector using a routing network in accordance with an illustrative embodiment. Operation begins, and the routing network routes pairs of vector elements from one or more vector registers into floating point adders in the SIMD unit (block 602). The SIMD unit performs a floating point addition operation and stores the results into a results register (block 604). Then, the routing network routes the summation results from the results buffer into a subset of the floating point adders in the SIMD unit (block 606). The SIMD unit performs a second floating point addition operation and stores the results into the results register to form at least one summation result (block 608). Thereafter, operation ends.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for performing a floating point collect and operate for a summation across a vector for a dot product operation. A routing network placed before the single instruction multiple data (SIMD) unit allows the SIMD unit to perform a summation across a vector with a single stage of adders. The routing network routes the vector elements to the adders in a first cycle. The SIMD unit stores the results of the adders into a results vector register. The routing network routes the summation results from the results vector register to the adders in a second cycle. The SIMD unit then stores the results from the second cycle in the results vector register.

This operation results in a two-to-one compression such that performing the operation again on the first result finishes the compression to one result. This operation effectively breaks the original addition across the vector into two operations of shorter latency. For the cost of the routing network, the design reduces the number of adders and may reduce the pipeline depth of the design.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing a floating point collect and operate for a summation across a vector, the method comprising:

routing, by a routing network in a first cycle, a first vector element from a first input vector register to a first input of a first floating point adder of a single instruction multiple data (SIMD) unit, a second vector element from the first input vector register to a second input of the first floating point adder, a third vector element from the first input vector register to a first input of a second floating point adder of the SIMD unit, and a fourth vector element from the first input vector register to a second input of the second floating point adder;

routing, by the routing network in the first cycle, a first vector element from a second input vector register to a third floating point adder of the SIMD unit, a second vector element from the second input vector register to a second input of the third floating point adder, a third vector element from the second input vector register to a first input of a fourth floating point adder of the SIMD unit, and a fourth vector element from the second input vector register to a second input of the fourth floating point adder;

performing, by the SIMD unit in the first cycle, a first addition operation and a second addition operation such that the first floating point adder adds the first vector element and the second vector element to form a first result and the second floating point adder adds the third vector element and the fourth vector element to form a second result;

performing, by the SIMD unit in the first cycle, a fourth addition operation and a fifth addition operation such that the third floating point adder adds the first vector element and the second vector element from the second input vector register to form a third result and the fourth floating point adder adds the third vector element and the fourth vector element to form a fourth result;

storing, by the SIMD unit in a first cycle, the first result into a first element of a result vector register and the second result into a second element of the result vector register;

storing, by the SIMD unit in the first cycle, the third result into a third element of the result vector register and the fourth result into a fourth element of the result vector register;

routing, by the routing network in a second cycle, the first element of the result vector register to the first input of a first selected floating point adder selected from the first floating point adder or the second floating point adder, and the second element of the result vector register to the second input of the first selected floating point adder;

routing, by the routing network in the second cycle the third element of the result vector register to the first input of a second selected floating point adder selected from the third floating point adder or the fourth floating point adder, and the second element of the result vector register to the second input of the second selected floating point adder;

performing, by the SIMD unit in the second cycle, a third addition operation such that the first selected floating point adder adds the first result and the second result to form a summation across the first input vector register;

performing, by the SIMD unit in the second cycle, a sixth addition operation such that the second selected floating point adder adds the third result and the fourth result to form a summation across the second input vector register;

storing, by the SIMD unit in the second cycle, the summation across the first input vector register into an element of the result vector register; and storing, by the SIMD unit in the second cycle, the summation across the second input vector register into an element of the result vector register.

2. The method of claim 1, wherein the routing network comprises a first multiplexer and a second multiplexer, and wherein routing in the first cycle comprises setting a selection signal of the first multiplexer and the second multiplexer to a first value, and wherein routing in the second cycle comprises setting the selection signal of the first multiplexer and the second multiplexer to a second value.

3. The method of claim 1, wherein the routing network comprises a first multiplexer, a second multiplexer, a third multiplexer, and a fourth multiplexer, and wherein routing in the first cycle comprises setting a selection signal of the first multiplexer, the second multiplexer, the third multiplexer, and the fourth multiplexer to a first value, and wherein routing in the second cycle comprises setting the selection signal of the first multiplexer, the second multiplexer, the third multiplexer, and the fourth multiplexer to a second value.

4. A method in a data processing system, for performing a floating point collect and operate for a summation across vectors, the method further comprising:

routing, by a routing network in a first cycle, a first vector element and a second vector element from a first input vector register to a single instruction multiple data (SIMD) unit and a first vector element and a second vector element from a second input vector register to the SIMD unit;

performing, by the SIMD unit in the first cycle, a first addition operation and a second addition operation such that the first addition operation adds the first vector element and the second vector element from the first input vector register to form a first result and the second addition operation adds a third vector element and a fourth vector element from the first input vector register to form a second result, and a fourth addition operation and a fifth addition operation such that the fourth addition operation adds the first vector element and the second vector element from the second input vector register to form a third result and the fifth addition operation adds a third vector element and a fourth vector element from the second input vector register to form a fourth result;

storing, by the SIMD unit in the first cycle, the first result into a first element of a result vector register and the second result into a second element of the result vector register and the third result into a third element of the result vector register and the fourth result into a fourth element of the result vector register;

routing, by the routing network in a second cycle, the first element and the second element of the result vector register to the SIMD unit and the third element and the fourth element of the result vector register to the SIMD unit;

performing, by the SIMD unit in the second cycle, a third addition operation such that the third addition operation adds the first result and the second result to form a summation across the first input vector register and a sixth addition operation such that the sixth addition operation adds the third result and the fourth result to form a summation across the second input vector register; and storing, by the SIMD unit in the second cycle, the summation across the first input vector register into the first element of the result vector register and the summation across the second input vector register into the second element of the result vector register.

5. The method of claim 4, wherein the routing network comprises a first multiplexer, a second multiplexer, a third multiplexer, and a fourth multiplexer, and wherein routing in the first cycle comprises setting a selection signal of the first multiplexer, the second multiplexer, the third multiplexer, and the fourth multiplexer to a first value, and wherein routing in the second cycle comprises setting the selection signal of the first multiplexer, the second multiplexer, the third multiplexer, and the fourth multiplexer to a second value.

6. The method of claim 4, wherein the SMD unit comprises a first floating point adder, a second floating point adder, a third floating point adder, and a fourth floating point adder, wherein routing in the first cycle comprises routing the first vector element of the first input vector register to a first input of the first floating point adder, routing the second vector element of the first vector register to a second input of the first floating point adder, routing the first vector element of the second input vector register to a first input of the third floating point adder, and routing the second vector element of the second vector register to a second input of the third floating point adder.

7. The method of claim 6, wherein outing in the first cycle further comprises routing the third vector element of the first input vector register to a first input of the second floating point adder, routing the fourth vector element of the first input vector register to a second input of the second floating point adder, routing the third vector element of the second input vector register to a first input of the fourth floating point adder, and routing the fourth vector element of the second input vector register to a second input of the fourth floating point adder.

8. The method of claim 6, wherein routing in the second cycle comprises routing the first element of the result vector register to the first input of the first floating point adder, routing the second element of the result vector register to the second input of the first floating point adder, routing the third element of the result vector register to the first input of the third floating point adder, and routing the fourth element of the result vector register to the second input of the third floating point adder.

9. The method of claim 4, wherein the SIMD unit is a first SIMD unit and wherein the result vector register is a first result vector register, the method further comprising:

performing, by a second SIMD unit in the first cycle, a seventh addition operation and an eighth addition operation such that the seventh addition operation adds a first vector element and a second vector element of the third input vector register to form a fifth result and the eighth addition operation adds a third vector element and a fourth vector element from the third input vector register to form a sixth result, and a ninth addition operation and a tenth addition operation such that the ninth addition operation adds a first vector element and a second vector element from a fourth input vector register to form a seventh result and the tenth addition operation adds a third vector element and a fourth vector element from the fourth input vector register to form a eighth result;

storing, by the second SIMD unit in the first cycle, the fifth result into a first element of a second result vector register and the sixth result into a second element of the second result vector register and the seventh result into a third element of the second result vector register and the eighth result into a fourth element of the second result vector register;

routing, by the routing network in the second cycle, the first element and the second element of the second result vector register to the first SIMD unit and the third element and the fourth element of the second result vector register to the first SIMD unit;

performing, by the first SIMD unit in the second cycle, an eleventh addition operation such that the eleventh addition operation adds the fifth result and the sixth result to form a summation across the third input vector register and a twelfth addition operation such that the twelfth addition operation adds the seventh result and the eighth result to form a summation across the fourth input vector register; and storing, by the first SIMD unit in the second cycle, the summation across the third input vector register into a third element of the first result vector register and the summation across the fourth input vector register into a fourth element of the first result vector register.

10. An apparatus for performing a floating point collect and operate for a summation across a vector, comprising:

a routing network; and a single instruction multiple data (SIMD) unit, wherein the routing network is configured to route, in a first cycle, a first vector element from first input vector register to a first floating point adder of the SIMD unit, a second vector element from the first input vector register to a second input of the first floating point adder, a third vector element from the first input vector register to a first input of a second floating point adder of the SIMD unit, and a fourth vector element from the first input vector register to a second input of the second floating point adder;

wherein the routing network is configured to route, in the first cycle, a first vector element from a second input vector register to a third floating point adder of the SIMD unit, a second vector element from the second input vector register to a second input of the third floating point adder, a third vector element from the second input vector register to a first input of a fourth floating point adder of the SIMD unit, and a fourth vector element from the second input vector register to as second input of the fourth floating point adder;

wherein the SIMD unit is configured to perform, in the first cycle, a first addition operation and a second addition operation such that the first floating point adder adds the first vector element and the second vector element to form a first result and the second floating point adder adds the third vector element and the fourth vector element from the first input vector register to form a second result;

wherein the SIMD unit is configured to perform, in the first cycle, a fourth addition operation and a fifth addition oration such that the third floating point adder adds the first vector element and the second vector element from the second input vector register to form a third result and the fourth floating point adder adds the third vector element and the fourth vector element to form a fourth result;

wherein the SIMD unit is configured to store, in the first cycle, the first result into a first element of a result vector register and the second result into a second element of the result vector register;

wherein the SIMD unit tired to store, in the first cycle the third result into a third element of the result vector register and the fourth result into a fourth element of the result vector register;

wherein the routing network is configured to route, in a second cycle, the first element of the result vector register to the first input of the first floating point adder and the second element of the result vector register to the second input of the first floating point adder;

wherein the routing network is configured to route, in the second cycle, the third element of the result vector register to the first input of a second selected floating point adder selected from the third floating point adder or the fourth floating point adder, and the second element of the result vector register to the second input of the second selected floating point adder;

wherein the SIMD unit is configured to perform, in the second cycle, a third addition operation such that the first floating point adder adds the first result and the second result to form a summation across the first input vector register;

wherein the SIMD unit is configured to perform, in the second cycle, a sixth addition operation such that the second selected floating point adder adds the third result and the fourth result to form a summation across the second input vector register;

wherein the SIMD unit is configured to store, in the second cycle, the summation across the first input vector register into an element of the result vector register; and wherein the SIMD unit is configured to store, in the second cycle the summation across the second input vector register into an element of the result vector register.

11. The apparatus of claim 10, wherein the routing network comprises a first multiplexer and a second multiplexer, and wherein routing in the first cycle comprises setting a selection signal of the first multiplexer and the second multiplexer to a first value, and wherein routing in the second cycle comprises setting the selection signal of the first multiplexer and the second multiplexer to a second value.

12. The apparatus of claim 10, wherein the routing network comprises a first multiplexer, a second multiplexer, a third multiplexer, and a fourth multiplexer, and wherein routing in the first cycle comprises setting a selection signal of the first multiplexer, the second multiplexer, the third multiplexer, and the fourth multiplexer to a first value, and wherein routing in the second cycle comprises setting the selection signal of the first multiplexer, the second multiplexer, the third multiplexer, and the fourth multiplexer to a second value.

* * * * *